United States Patent
Nehl et al.

(10) Patent No.: US 8,286,763 B2
(45) Date of Patent: Oct. 16, 2012

(54) MAGNETORHEOLOGICAL FLUID-BASED DEVICE HAVING A MAGNETORHEOLOGICAL PISTON ASSEMBLY

(75) Inventors: Thomas Wolfgang Nehl, Shelby Township, MI (US); Alexander A. Alexandridis, Orchard Lake Village, MI (US); Robert T. Foister, Rochester Hills, MI (US); William C. Kruckemeyer, Beavercreek, OH (US); Fang Deng, Novi, MI (US)

(73) Assignee: BWI Company Limited S.A., Luxembourg (LU)

( * ) Notice: Subject to any disclaimer, the term of this patent is extended or adjusted under 35 U.S.C. 154(b) by 1222 days.

(21) Appl. No.: 12/011,663

(22) Filed: Jan. 29, 2008

(65) Prior Publication Data

US 2009/0188763 A1    Jul. 30, 2009

(51) Int. Cl.
*F16F 9/53* (2006.01)
(52) U.S. Cl. ..................... 188/267.2; 188/267
(58) Field of Classification Search .................. 188/267, 188/267.1, 267.2; 335/282, 299
See application file for complete search history.

(56) References Cited

U.S. PATENT DOCUMENTS

| | | | |
|---|---|---|---|
| 6,260,675 B1 | 7/2001 | Muhlenkamp | |
| 6,386,343 B1* | 5/2002 | Robinson et al. | 188/267 |
| 6,481,546 B2* | 11/2002 | Oliver et al. | 188/267.1 |
| 6,874,603 B2 | 4/2005 | Lisenker et al. | |
| 7,958,979 B2* | 6/2011 | Sekiya et al. | 188/267.2 |
| 2003/0221920 A1* | 12/2003 | Kuwahara | 188/158 |
| 2004/0188198 A1* | 9/2004 | Na | 188/267.2 |
| 2007/0193839 A1 | 8/2007 | Nakajima et al. | |
| 2008/0251982 A1 | 10/2008 | Sekiya et al. | |

FOREIGN PATENT DOCUMENTS

| | | |
|---|---|---|
| DE | 4433056 | 3/1996 |
| EP | 1219858 | 7/2002 |
| EP | 2055985 | 5/2009 |
| JP | 2009133472 A * | 6/2009 |

OTHER PUBLICATIONS

EP Search Report dated Jun. 23, 2009.

* cited by examiner

*Primary Examiner* — Bradley King
(74) *Attorney, Agent, or Firm* — Dickinson Wright PLLC

(57) ABSTRACT

A magnetorheological (MR) fluid-based device including an MR piston assembly. The MR piston assembly includes a ferromagnetic MR piston core and an electric coil. The MR piston core has a central longitudinal axis and has an outer circumferential surface substantially coaxially aligned with the central longitudinal axis. The electric coil is positioned in the MR piston core and is substantially coaxially aligned with the central longitudinal axis. A portion, or at least a portion, of the electric coil is buried in the MR piston core under the outer circumferential surface.

11 Claims, 6 Drawing Sheets

US 8,286,763 B2

MAGNETORHEOLOGICAL FLUID-BASED DEVICE HAVING A MAGNETORHEOLOGICAL PISTON ASSEMBLY

TECHNICAL FIELD

The present invention relates generally to magnetorheological fluid-based devices, and more particularly to a magnetorheological (MR) fluid-based device having an MR piston assembly.

BACKGROUND OF THE INVENTION

Conventional magnetorheological (MR) fluid-based devices include MR devices such as an MR damper and an MR clutch. One conventional MR damper includes an MR piston assembly having a ferromagnetic MR piston core, an electric coil, and an outer flux ring. The MR piston assembly is adapted to translate along the central longitudinal axis of the MR damper. The MR piston core has an outer circumferential surface which is substantially coaxially aligned with the central longitudinal axis and which has a circumferential surface slot having a substantially rectangular cross-sectional shape as seen in a transverse cross section of the MR piston core. The electric coil is substantially coaxially aligned with the central longitudinal axis and is disposed in the circumferential surface slot. Some MR piston assemblies include additional electric coils disposed one each in additional circumferential surface slots. The flux ring is concentric with, and spaced outward from, the piston core to form an annular passageway which is located between the flux ring and the MR piston core and which contains MR fluid.

The MR piston assembly of the MR damper also includes a piston rod attached to the MR piston core and first and second MR piston end plates longitudinally surrounding and contacting the MR piston core. The flux ring is attached to the first and second MR piston end plates, and the first and second MR piston end plates each have a through opening in fluid communication with the MR passageway.

One conventional MR clutch includes an MR piston assembly having a ferromagnetic MR piston core and an electric coil. The MR piston assembly is attached to an input shaft or an output shaft of the MR clutch and is adapted to rotate about the central longitudinal axis of the MR clutch. The arrangement of the electric coil and the MR piston core is the same as in the previously-described conventional MR damper.

What is needed is an improved magnetorheological (MR) device having an MR piston assembly.

SUMMARY OF THE INVENTION

A first expression of a first embodiment of the invention is for a magnetorheological (MR) fluid-based device including an MR piston assembly having a ferromagnetic MR piston core and an electric coil. The MR piston core has a central longitudinal axis and has an outer circumferential surface substantially coaxially aligned with the central longitudinal axis. The electric coil is positioned in the MR piston core and is substantially coaxially aligned with the central longitudinal axis. At least a portion of the electric coil is buried in the MR piston core under the outer circumferential surface.

A second expression of a first embodiment of the invention is for a magnetorheological (MR) fluid-based device including an MR piston assembly having a ferromagnetic MR piston core and an electric coil. The MR piston core has a central longitudinal axis and has an outer circumferential surface substantially coaxially aligned with the central longitudinal axis. The outer circumferential surface has a circumferential surface slot substantially coaxially aligned with the central longitudinal axis. The circumferential surface slot has a portion located under the outer circumferential surface. The electric coil is substantially coaxially aligned with the central longitudinal axis and is positioned in the circumferential surface slot, wherein a portion of the electric coil is buried under the outer circumferential surface.

A first expression of a second embodiment of the invention is for a magnetorheological (MR) fluid-based device including an MR piston assembly having a ferromagnetic MR piston core and an electric coil. The MR piston core has a central longitudinal axis and includes an identical number of first and second pluralities of fingers. The fingers of the second plurality longitudinally extend opposite to the fingers of the first plurality. The fingers of the second plurality are interdigitated with the fingers of the first plurality. The electric coil is substantially coaxially aligned with the central longitudinal axis, wherein at least a portion of the electric coil is buried under the fingers of the first and second pluralities.

Several benefits and advantages are derived from one or more of the expressions of the first and second embodiments of the invention. In one example, the partially (or at least partially) buried coil should result in a higher MR force for a given excitation of the electric coil compared to a conventional unburied coil. In another example, the partially (or at least partially) buried coil should result in the same MR force from a lower applied coil Ampere turns compared to a conventional unburied coil. It is noted that an electric coil disposed in a circumferential surface slot having a conventional rectangular cross-sectional shape is an unburied coil because no portion of the electric coil is buried under (i.e., covered by) the outer circumferential surface of the ferromagnetic MR piston core.

DETAILED DESCRIPTION

Figure 1:
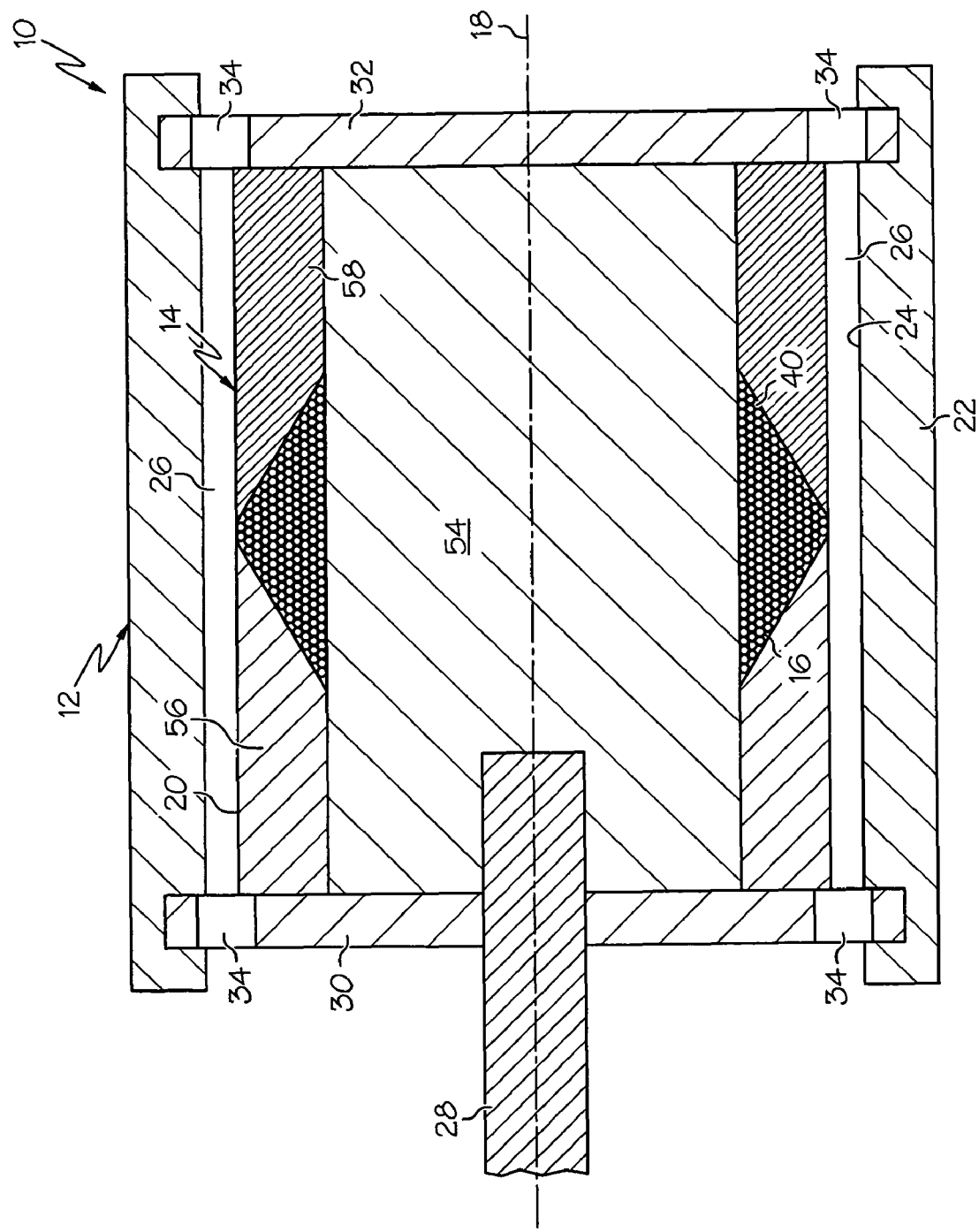
FIG. 1 is a schematic, cross-sectional view of a first embodiment of the invention showing an MR fluid-based device including an MR piston assembly having an MR piston core, an electric coil, a flux ring, a piston rod, and first and second MR piston end plates, wherein adaptations for electrical connection of the coil have been omitted for clarity.
Figure 2:
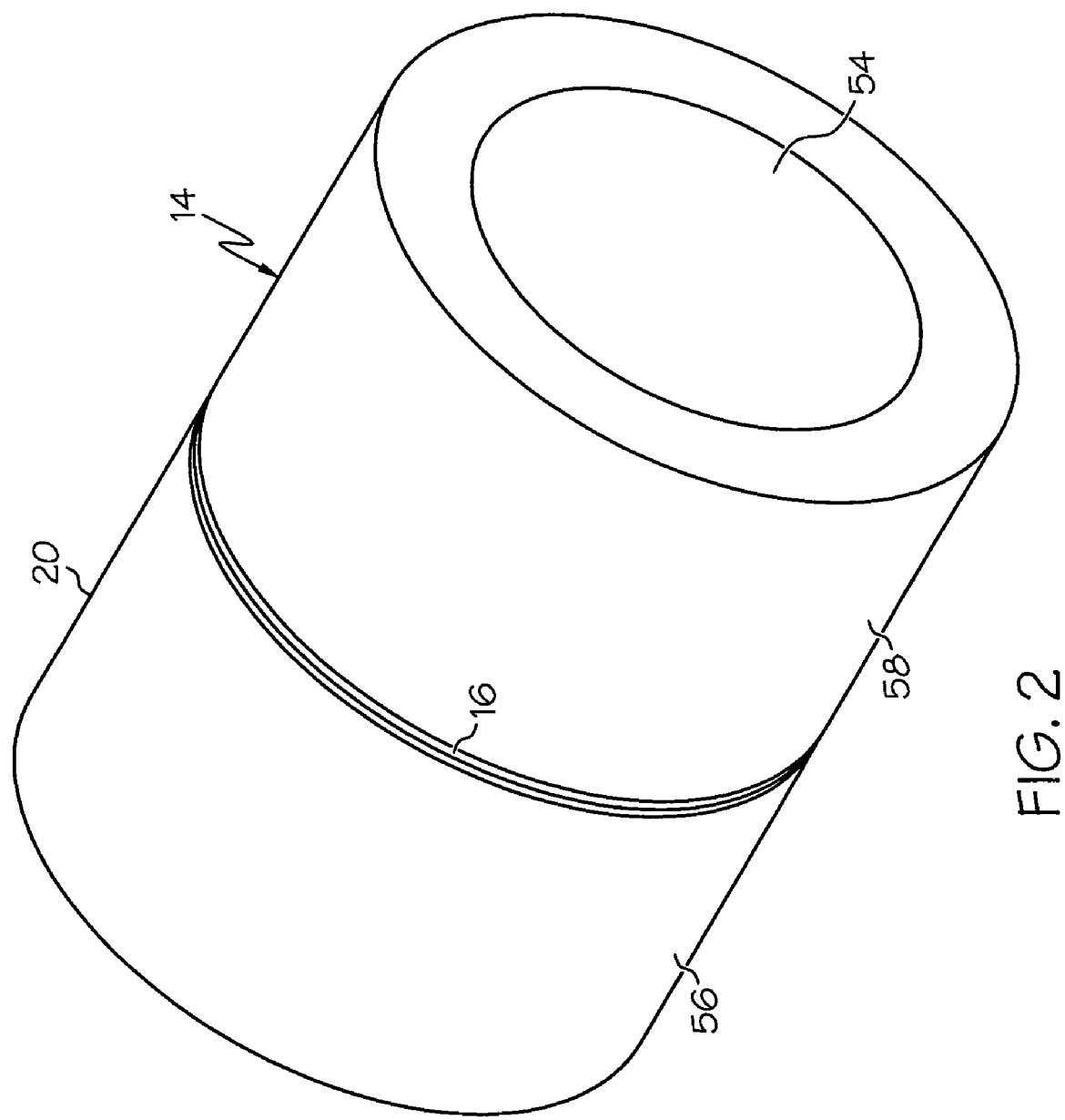
FIG. 2 is a perspective view of the MR piston core and the electric coil of FIG. 1.
Figure 3:
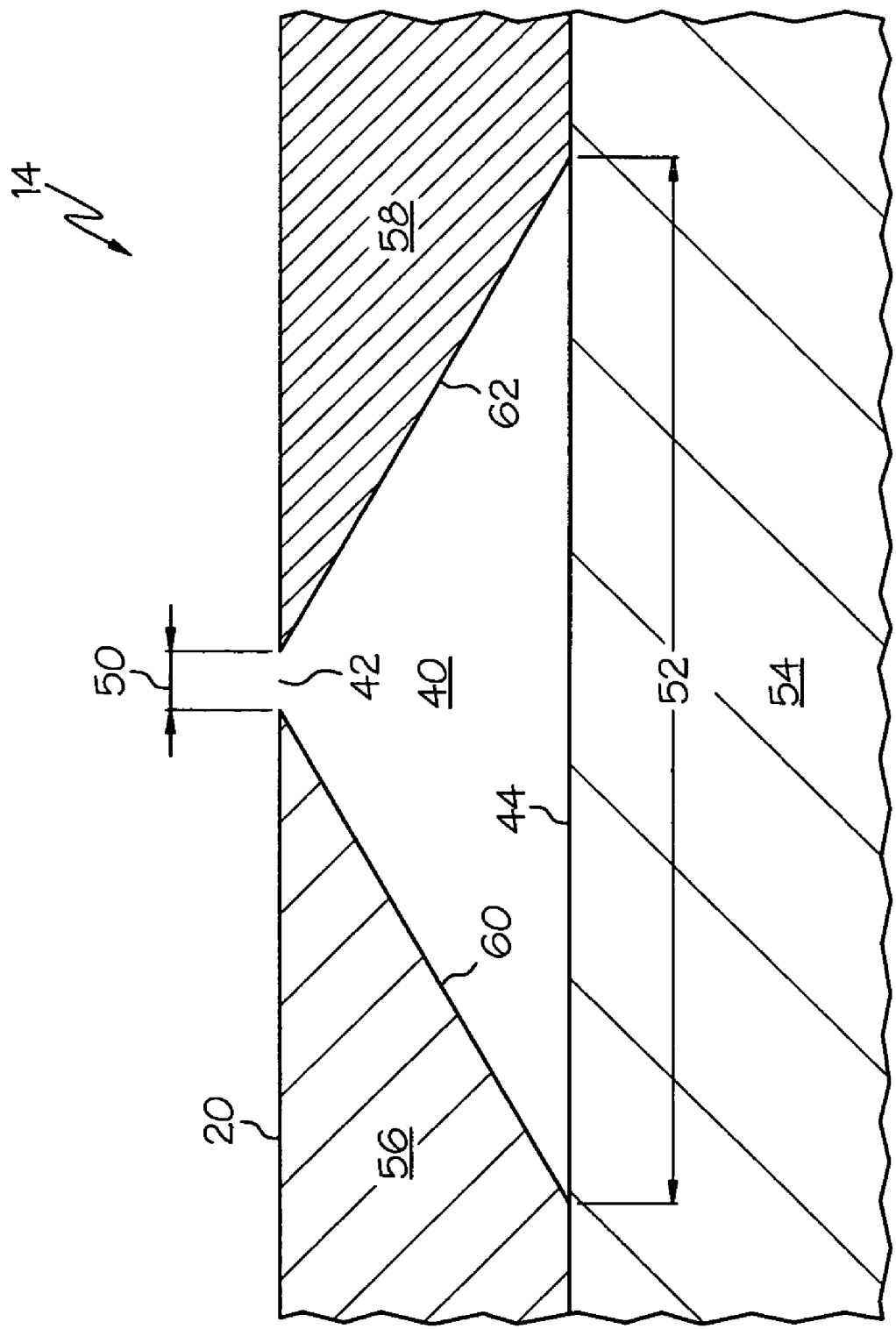
FIG. 3 is an enlarged view of an upper portion of the MR piston core of FIG. 1 showing the circumferential surface slot without the electric coil disposed therein.

Referring now to the drawings, wherein like numerals represent like elements throughout, FIGS. 1-3 show a first embodiment of the present invention. A first expression of the embodiment of FIGS. 1-3 is for a magnetorheological (MR) fluid-based device 10 including an MR piston assembly 12 having a ferromagnetic MR piston core 14 and an electric coil 16. The MR piston core 14 has a central longitudinal axis 18 and has an outer circumferential surface 20 substantially coaxially aligned with the central longitudinal axis 18. The electric coil 16 is disposed in the MR piston core 14 and is substantially coaxially aligned with the central longitudinal axis 18. At least a portion of the electric coil 16 is buried in the MR piston core 14 under the outer circumferential surface 20. "Buried in the MR piston core under the outer circumferential surface" means to be disposed in the ferromagnetic MR piston core and covered by the outer circumferential surface of the ferromagnetic MR piston core.

In one construction of the first expression of the embodiment of FIGS. 1-3, a majority of the electric coil 16 is buried in the MR piston core 14 under the outer circumferential surface 20. In one variation, the electric coil 16 is disposed proximate the outer circumferential surface 20.

In one enablement of the first expression of the embodiment of FIGS. 1-3, the MR piston assembly 12 also includes a flux ring 22 having an inner circumferential surface 24 substantially coaxially aligned with the central longitudinal axis 18, wherein the inner circumferential surface 24 faces and is spaced apart from the outer circumferential surface 20 creating an MR passageway 26 therebetween. In one variation, the MR piston assembly 12 also includes a piston rod 28 and first and second MR piston end plates 30 and 32. The piston rod 28 is substantially coaxially aligned with the central longitudinal axis 18 and is attached to the MR piston core 14. The MR piston core 14 is disposed longitudinally between and in contact with the first and second MR piston end plates 30 and 32. The flux ring 22 is attached to the first and second MR piston end plates 30 and 32. The first and second MR piston end plates 30 and 32 each have a through opening 34 in fluid communication with the MR passageway 26.

In one application of the first expression of the embodiment of FIGS. 1-3, such as in some linear MR dampers, the MR piston core 14 is adapted to translate along the central longitudinal axis 18. In a different application, such as in an MR clutch or in some rotary MR dampers, the MR piston core 14 is adapted to rotate about the central longitudinal axis 18. Other applications include a linear MR damper having a non-translatable MR piston core and a rotary MR damper having a non-rotatable MR piston core, as can be appreciated by those skilled in the art.

In one implementation of the first expression of the embodiment of FIGS. 1-3, the MR device 10 includes a cylinder (not shown) which is substantially coaxially aligned with the central longitudinal axis 18 and which surrounds the flux ring 22. In one variation, the MR device 10 includes MR fluid (not shown) disposed in the cylinder, in the MR passageway 26, and in the through openings 34.

A second expression of the embodiment of FIGS. 1-3 is for a magnetorheological (MR) fluid-based device 10 including an MR piston assembly 12 having a ferromagnetic MR piston core 14 and an electric coil 16. The MR piston core 14 has a central longitudinal axis 18 and has an outer circumferential surface 20 substantially coaxially aligned with the central longitudinal axis 18. The outer circumferential surface 20 has a circumferential surface slot 40 substantially coaxially aligned with the central longitudinal axis 18. The circumferential surface slot 40 has a portion disposed under the outer circumferential surface 20. The electric coil 16 is substantially aligned with the central longitudinal axis 18 and is disposed in the circumferential surface slot 40, wherein a portion of the electric coil 16 is buried under the outer circumferential surface 20. "Buried under the outer circumferential surface" means to be covered by the outer circumferential surface of the ferromagnetic MR piston core.

It is noted that a circumferential surface slot 40 has an open top 42 disposed at the outer circumferential surface 40 and has a closed bottom 44 disposed furthest from the outer circumferential surface 40. The cross-sectional shape of the circumferential surface slot 40 as seen in a transverse cross section of the MR piston core 14 (such as that seen in FIG. 3) is adapted to allow a portion of the electric coil 16 to be buried under the outer circumferential surface 20. Examples of such cross-sectional shapes include, without limitation, a substantial trapezoidal shape (as seen in FIG. 3), a substantial diamond shape, etc. It is noted that the top 42 of the circumferential surface slot 40 has a longitudinal length 50, that the circumferential surface slot 40 has a maximum longitudinal extent 52, and that the longitudinal length of the top 42 is less than the maximum longitudinal extent 52. In one example, the longitudinal length 50 of the top 42 is less than half (and in one variation less than ten percent) of the maximum longitudinal extent 52.

In one arrangement of the second expression of the embodiment of FIGS. 1-3, a majority of the electric coil 16 is buried under the outer circumferential surface 20.

In one construction of the second expression of the embodiment of FIGS. 1-3, the MR piston core 14 includes at least two separate core pieces 54, 56 and 58, wherein installation of the electric coil 16 occurs during assembly of the at-least-two separate core pieces 54, 56 and 58, as can be appreciated by those skilled in the art. In one variation, the circumferential surface slot 40 includes first and second slot sides 60 and 62 extending from the top 42 to the bottom 44 of the circumferential surface slot 40. In one modification, the at-least-two separate core pieces 54, 56 and 58 include a monolithic main core piece 54 defining at least the bottom 44 of the circumferential surface slot 40 and a monolithic peripheral core piece 56 defining the first slot side 60 but not the second slot side 62.

In one example, the at-least-two core pieces 54, 56 and 58 include a monolithic additional peripheral core piece 58 defining the second slot side 62, wherein the at-least-two separate core pieces 54, 56 and 58 consist essentially of the main core piece 54, the peripheral core piece 56 and the additional peripheral core piece 58. In a different example, not shown, the at-least-two separate core pieces consist essentially of the main core piece and the peripheral core piece, wherein the main core piece also defines the second slot side (e.g., imagine in FIG. 3 that pieces 54 and 58 are portions of a monolithic piece).

In one configuration of the second expression of the embodiment of FIGS. 1-3, the electric coil 16 fills the circumferential surface slot 40 to proximate the outer circumferential surface 20. It is noted that the enablements, applications, and implementations of the first expression of the embodiment of FIGS. 1-3 are equally applicable to the second expression of the embodiment of FIGS. 1-3. In the variation which includes the first and second MR piston end plates 30 and 32, it is noted that the main core piece 54 and the peripheral core piece 56 are disposed longitudinally between the first and second MR piston end plates 30 and 32 with the main core piece 54 in contact with the first and second MR piston end plates 30 and 32 and the peripheral core piece 56 in contact with the first MR piston end plate 30 but not with the second MR piston end plate 32.

Figure 4:
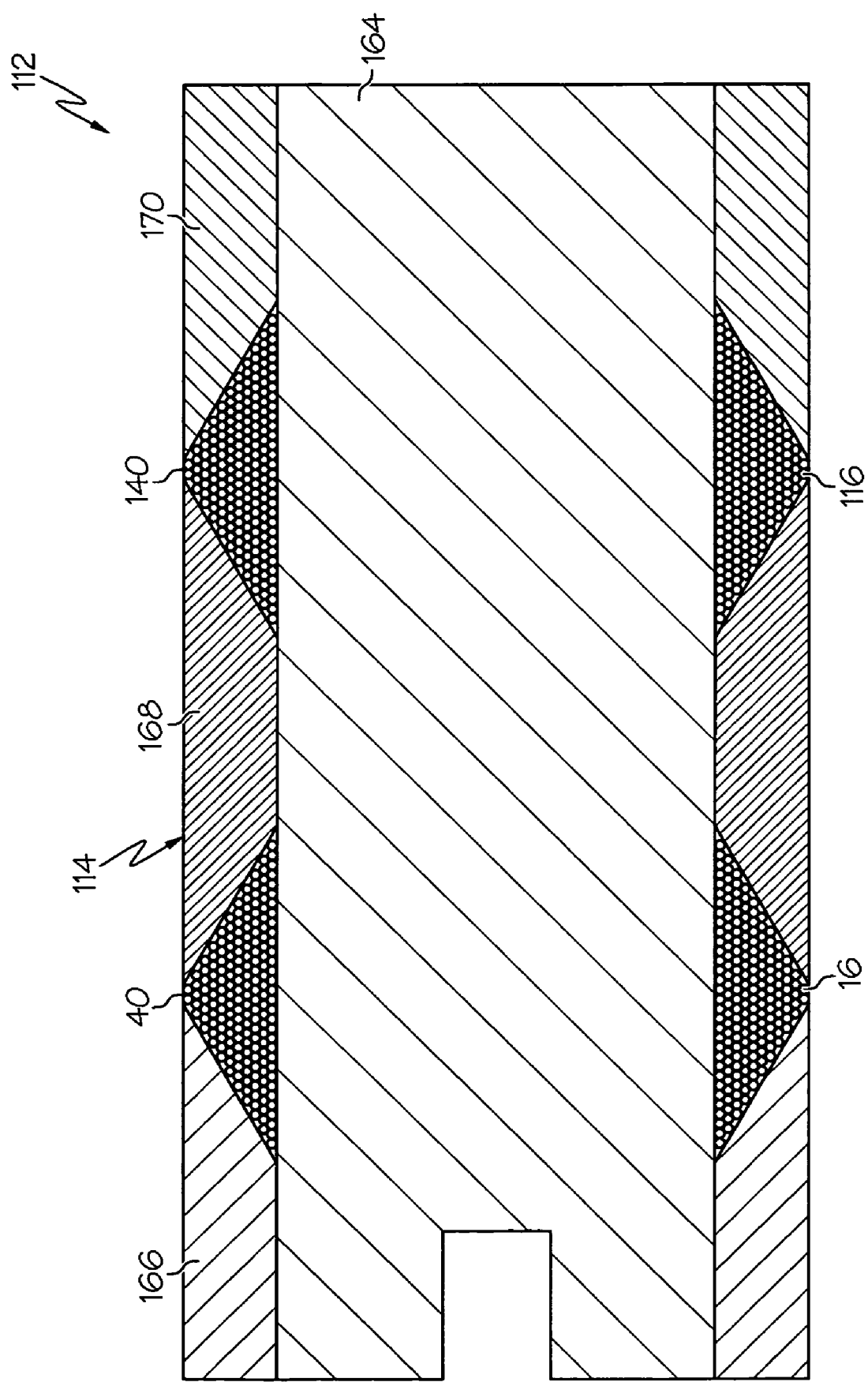
FIG. 4 is a schematic, cross-sectional view of a portion of an alternate embodiment of the MR piston assembly of FIG. 1 wherein the MR piston core has two circumferential surface slots and wherein two electric coils are disposed one each in the two circumferential surface slots.

In one extension of the second expression of the embodiment of FIGS. 1-3, as shown in the embodiment of FIG. 4, the MR piston assembly 112 also includes a second electric coil 116 disposed in a second circumferential surface slot 140 of the MR piston core 114, wherein the electric coil 16 and the second electric coil 116 are adapted to produce magnetic flux in opposite directions (such as by being oppositely wound or by being electrically driven with opposite polarity). In one variation, the second electric coil 168 is substantially identical to the electric coil 16. In one modification, the MR piston core 114 includes at least four core pieces 164, 166, 168, and 170, such as monolithic main core piece 164, monolithic proximal-annular core piece 166, monolithic central-annular core piece 168, and monolithic distal-annular core piece 170. In one example, the main core piece 166 forms the bottom of the circumferential surface slot 40 and the bottom of the second circumferential surface slot 140, the proximal-annular core piece 166 forms one side of the circumferential surface slot 40, the central-annular core piece 168 forms the other side of the circumferential surface slot 40 and one side of the second circumferential surface slot 140, and the distal-annular core piece 170 forms the other side of the second circumferential surface slot 40. Use of additional electric coils and circumferential surface slots, whether the surface slots have the same or different cross-sectional shapes, is left to the artisan.

Figure 5:
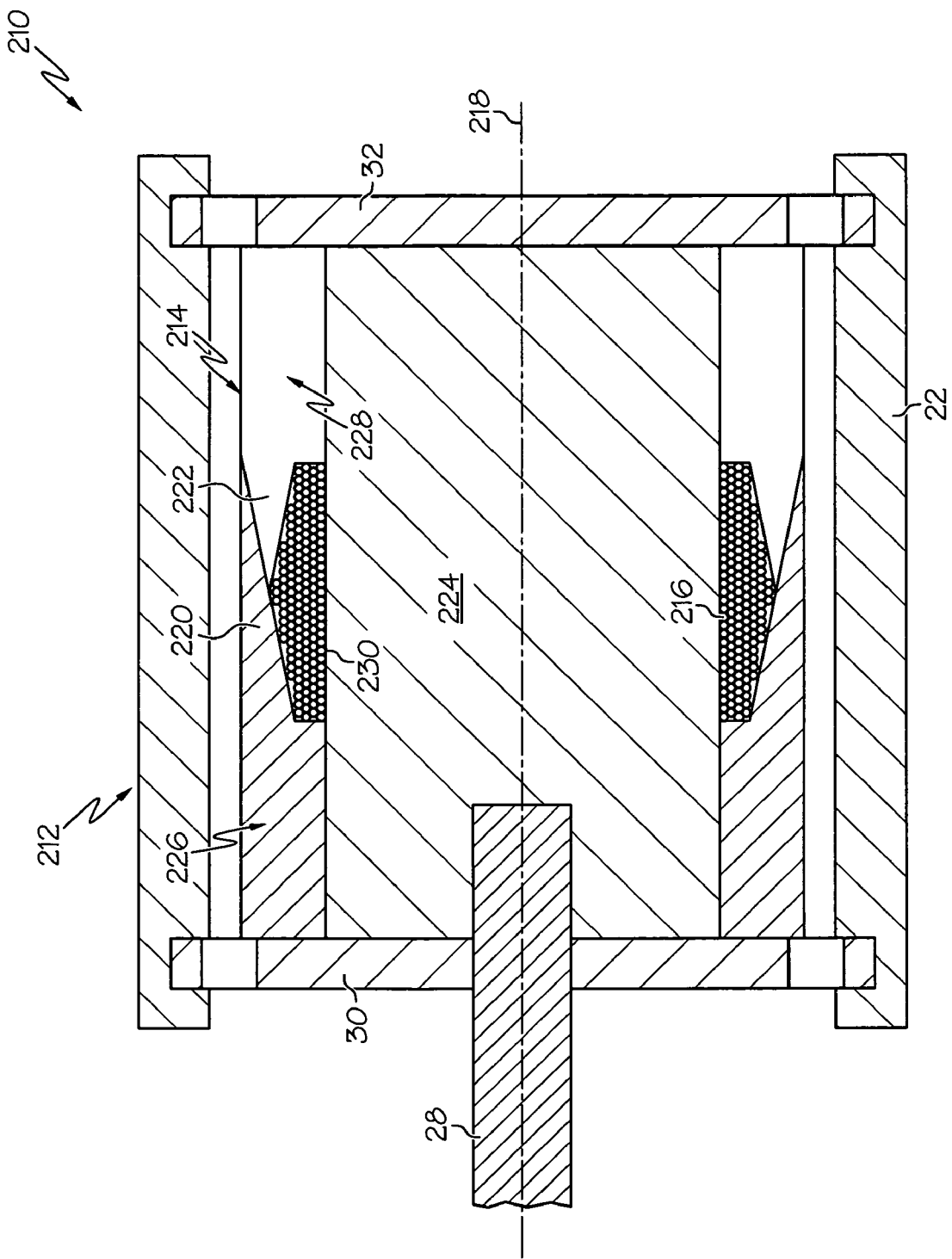
FIG. 5 is a schematic, cross-sectional view of a second embodiment of the invention showing an MR fluid-based device including an MR piston assembly having an MR piston core, an electric coil, a flux ring, a piston rod, and first and second MR piston end plates, wherein adaptations for electrical connection of the coil have been omitted for clarity.
Figure 6:
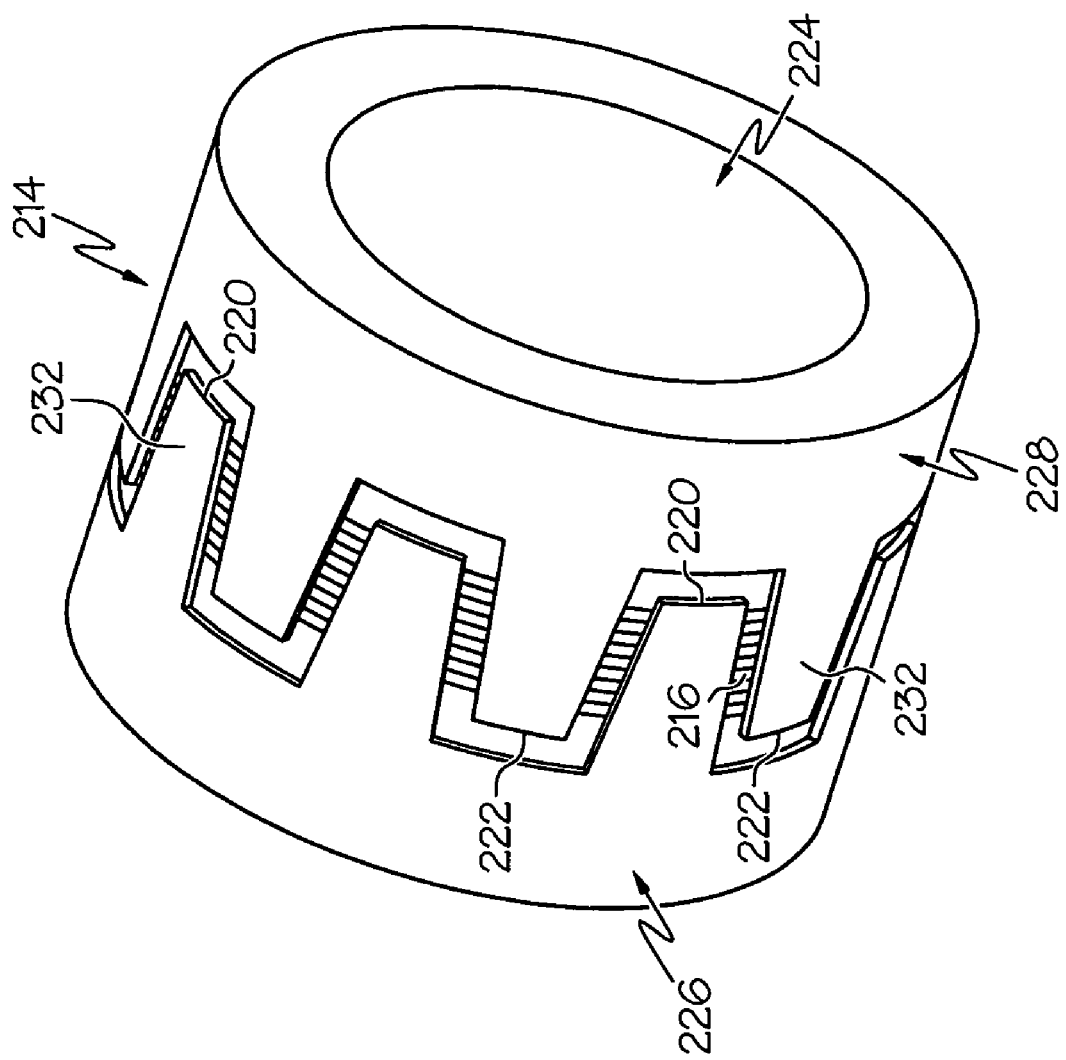
FIG. 6 is a perspective view of the MR piston core and the electric coil of FIG. 5.

Referring again to the drawings, FIGS. 5-6 show a second embodiment of the present invention. A first expression of the embodiment of FIGS. 5-6 is for a magnetorheological (MR) fluid-based device 210 including an MR piston assembly 212 having a ferromagnetic MR piston core 214 and an electric coil 216. The MR piston core 214 has a central longitudinal axis 218 and includes an identical number of first and second pluralities of fingers 220 and 222. The fingers 222 of the second plurality longitudinally extend opposite to the fingers 220 of the first plurality. The fingers 222 of the second plurality are interdigitated with the fingers 220 of the first plurality. The electric coil 216 is substantially coaxially aligned with the central longitudinal axis 218, wherein at least a portion of the electric coil 216 is buried under the fingers 220 and 222 of the first and second pluralities. "Buried under the fingers" means to be covered by the fingers of the ferromagnetic MR piston core.

In one arrangement of the first expression of the embodiment of FIGS. 5-6, a majority of the electric coil 216 is buried under the fingers 220 and 222 of the first and second pluralities. In one variation, at least seventy-five percent of the electric coil 216 is buried under the fingers 220 and 222 of the first and second pluralities.

In one construction of the first expression of the embodiment of FIGS. 5-6, the MR piston core 214 includes at least two separate core pieces 224, 226 and 228, wherein installation of the electric coil 216 occurs during assembly of the at-least-two separate core pieces 224, 226 and 228, as can be appreciated by those skilled in the art. In one variation, the electric coil 216 has a bottom 230. In one modification, the at-least-two separate core pieces 224, 226 and 228 include a monolithic main core piece 224 contacting the bottom 230 of the electric coil 216 and a monolithic peripheral core piece 226 having the fingers 220 of the first plurality but not the fingers 222 of the second plurality.

In one example, the at-least-two core pieces 224, 226 and 228 include a monolithic additional peripheral core piece 228 having the fingers 222 of the second plurality, wherein the at-least-two separate core pieces 224, 226 and 228 consist essentially of the main core piece 224, the peripheral core piece 226 and the additional peripheral core piece 228. In a different example, not shown, the at-least-two separate core pieces consist essentially of the main core piece and the peripheral core piece, wherein the main core piece also has the fingers of the second plurality (e.g., imagine in FIGS. 5-6 that pieces 224 and 228 are portions of a monolithic piece).

In one application of the first expression of the embodiment of FIGS. 5-6, the MR piston core 214 is adapted to translate along the central longitudinal axis 218. In a different application, the MR piston core 214 is adapted to rotate about the central longitudinal axis 218. It is noted that FIG. 5 also shows other components, such as a flux ring 22, previously discussed with respect to the embodiment of FIGS. 1-3.

A second expression of the embodiment of FIGS. 5-6 is for a magnetorheological (MR) device 210 including an MR piston assembly 212 having a ferromagnetic MR piston core 214 and an electric coil 216. The MR piston core 214 has a central longitudinal axis 218 and has an outer circumferential surface 232 substantially coaxially aligned with the central longitudinal axis 218. The electric coil 216 is disposed in the MR piston core 214 and is substantially coaxially aligned with the central longitudinal axis 218. At least a portion of the electric coil 216 is buried in the MR piston core 214 under the outer circumferential surface 232. It is noted that the outer circumferential surface 232 includes the combined outer surfaces of the fingers 220 and 222 of the first and second pluralities.

It is noted that the MR piston core of any one or more or all of the embodiments may include an MR bypass passageway (not shown). MR fluid passing through an MR bypass passageway is essentially not magnetically influenced by the electric coil at the design maximum current level. In contrast, MR fluid passing through an MR passageway is substantially magnetically influenced by the electric coil at the design maximum current level.

Several benefits and advantages are derived from one or more of the expressions of the first and second embodiments of the invention. In one example, the partially (or at least partially) buried coil should result in a higher MR force for a given excitation of the electric coil compared to a conventional unburied coil. In another example, the partially (or at least partially) buried coil should result in the same MR force from a lower applied coil Ampere turns compared to a conventional unburied coil. It is noted that an electric coil disposed in a circumferential surface slot having a conventional rectangular cross-sectional shape is an unburied coil because no portion of the electric coil is buried under (i.e., covered by) the outer circumferential surface of the ferromagnetic MR piston core.

Additionally, in one example having a circumferential surface slot with a cross-sectional shape of a substantial trapezoid, the magnetically active regions of the MR piston core are extended in longitudinal length and, at the same time, the magnetically inactive region directly adjacent to the electric coil(s) is reduced in longitudinal length. In this example, higher performance should be achieved in that the MR force is maximized when the MR device is magnetized and the MR force is reduced when the MR device is de-magnetized. In this example, the effective dynamic range, or turn-up ratio, of the MR device should be enhanced in comparison to an MR device having an electric coil disposed in a circumferential surface slot having a conventional rectangular cross-sectional shape.

The foregoing description of several expressions of embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A magnetorheological (MR) piston assembly comprising;
a piston core of ferromagnetic material including a main core of cylindrical shape extending along a central longitudinal axis from a first longitudinal end to a second longitudinal end
said piston core including an outer circumferential surface and a first slot side and a second slot side defining a circumferential slot circumscribing said outer circumferential surface of said piston core and having an open top open to said outer circumferential surface and a closed bottom spaced from said open top by said first and second slot sides,
an electric coil disposed in said circumferential slot for magnetically influencing said piston core,
and characterized by
said slot sides of said piston core extending radially inwardly at a constant angle from a narrow longitudinal length at said open top to a maximum longitudinal length greater than said narrow longitudinal length at said closed bottom to define a trapezoidal cross-section of said circumferential slot for maximizing magnetic influence of said electric coil on said piston core, and
said peripheral core including a first peripheral core disposed about said main core and extending from said first longitudinal end to said first slot side and a second peripheral core disposed about said main core and extending from said second longitudinal end to said second slot side.

2. An assembly as set forth in claim 1 wherein said piston core further includes a third slot side and a fourth slot side defining a second slot extending circumferentially along said outer circumferential surface and having an open top open to said outer circumferential surface.

3. An assembly as set forth in claim 1 wherein said piston core includes a first plurality of fingers adjacent said slot and extending longitudinally towards said second longitudinal end of said piston core and a second plurality of fingers and adjacent said slot and extending longitudinally towards said first longitudinal end of said piston core in interdigitated sequential arrangement with said first plurality of fingers and spaced from said first plurality of fingers by said open top of said slot.

4. An assembly as set forth in claim 1 wherein said maximum longitudinal length between said slot sides is adjacent said main core piece.

5. An assembly as set forth in claim 1 further including;
a first end plate adjacent to and in contact with said first longitudinal end of said piston core and defining at least one opening extending through said first end plate, and
a second end plate adjacent to and in contact with said second longitudinal end of said piston core and defining at least one opening extending through said second end plate.

6. An assembly as set forth in claim 5 further including a flux ring attached to and extending between said first end plate and said second end plate having an inner circumferential surface disposed about and spaced from said outer circumferential surface of said piston core to define a MR passageway in fluid communication with said at least one opening of said first end plate and said second end plate.

7. An assembly as set forth in claim 1 further including a piston rod coaxially aligned with said central longitudinal axis and attached to said piston core at said first longitudinal end.

8. An assembly as set forth in claim 1 wherein said electric coil fills said slot from said closed bottom to said open top to place a portion of said electric coil flush with said outer circumferential surface of said piston core.

9. A magnetorheological (MR) piston assembly comprising;
a piston core of ferromagnetic material having a first longitudinal end and a second longitudinal end and a central longitudinal axis and an outer circumferential surface and a first slot side and a second slot side and said slot sides defining a slot circumscribing said outer circumferential surface and having an open top open to said outer circumferential surface and a closed bottom spaced from said open top by said slot sides,
an electric coil disposed in said slot for magnetically influencing said piston core,
a first end plate adjacent to and in contact with said first longitudinal end of said piston core and defining at least one opening extending through said first end plate,
a second end plate adjacent to and in contact with said second longitudinal end of said piston core and defining at least one opening extending through said second end plate,
a flux ring attached to and extending between said first end plate and said second end plate having an inner circumferential surface disposed about and spaced from said outer circumferential surface of said peripheral core piece to define a MR passageway in fluid communication with said at least one opening of said first end plate and said second end plate,
a piston rod coaxially aligned with said central longitudinal axis and attached to said piston core at said first longitudinal end,
and characterized by
said slot sides of said piston core extending radially inwardly at a constant angle from a narrow longitudinal length at said open top to a maximum longitudinal length greater than said narrow longitudinal length at said closed bottom to define a trapezoidal cross section of said slot for maximizing magnetic influence of said electric coil on said piston core, and
said piston core including a main core piece of cylindrical shape extending along said central longitudinal axis between said first longitudinal end and said second longitudinal end and a first peripheral core piece disposed about said main core piece and extending from said first longitudinal end to said first slot side and a second peripheral core piece disposed about said main core piece and extending from said second longitudinal end to said second slot side, and
said electric coil filling said slot from said closed bottom to said open top to place a portion of said electric coil flush with said outer circumferential surface of said piston core.

10. An assembly as set forth in claim 9 wherein said at least one peripheral core piece further includes a third slot side and a fourth slot side defining a second slot extending circumferentially along said outer circumferential surface and having an open top open to said outer circumferential surface.

11. An assembly as set forth in claim 9 wherein said at least one peripheral core piece further includes a first plurality of fingers adjacent said slot and extending longitudinally towards said second longitudinal end of said piston core and a second plurality of fingers adjacent said slot and extending longitudinally towards said first longitudinal end of said piston core in interdigitated sequential arrangement with said first plurality of fingers and spaced from said first plurality of fingers by said open top of said slot.

* * * * *